United States Patent [19]

Minieri

[11] 3,925,304

[45] Dec. 9, 1975

[54] SURFACE-COATING COMPOSITIONS CONTAINING N-(INDAZOLYL-N¹-METHYL)DIALKANOLAMINES

[75] Inventor: Pasquale P. Minieri, Woodside, N.Y.

[73] Assignee: Tenneco Chemicals, Inc., Saddle Brook, N.J.

[22] Filed: Feb. 5, 1974

[21] Appl. No.: 439,721

Related U.S. Application Data

[62] Division of Ser. No. 308,156, Nov. 20, 1972, Pat. No. 3,828,067.

[52] U.S. Cl. ......... 260/45.8 N; 106/15 AF; 106/18; 260/29.6 MN; 260/89.1; 260/310 C; 260/999; 424/273
[51] Int. Cl.² ......................................... C09D 5/14
[58] Field of Search .. 260/29.6 MN, 45.8 N, 310 C; 106/15 AF; 424/273

[56] References Cited
UNITED STATES PATENTS

| | | | |
|---|---|---|---|
| 3,098,003 | 7/1963 | Riddell | 106/15 |
| 3,147,274 | 9/1964 | Moyle et al. | 260/309.2 |
| 3,386,951 | 6/1968 | Pauli et al. | 260/45.9 |
| 3,595,817 | 7/1971 | Deinet | 260/22 |
| 3,646,210 | 2/1972 | Akerstrom et al. | 424/274 |
| 3,647,818 | 3/1972 | Fenyes | 260/310 |
| 3,679,622 | 7/1972 | Grier | 260/29.7 |
| 3,766,192 | 11/1971 | Minieri | 260/89.1 |
| 3,779,972 | 12/1973 | Minieri | 260/89.1 |
| 3,779,973 | 12/1973 | Minieri | 260/89.1 |
| 3,822,243 | 7/1974 | Minieri | 260/89.1 |
| 3,828,068 | 8/1974 | Minieri | 260/89.1 |

*Primary Examiner*—Ronald W. Griffin
*Attorney, Agent, or Firm*—Evelyn Berlow

[57] ABSTRACT

Surface-coating compositions contain as biocide a compound having the structural formula

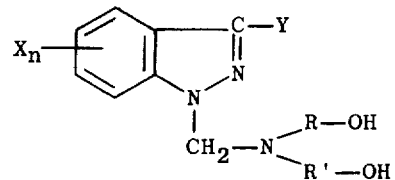

wherein X represents halogen, nitro, amino, acetamino, or (halobenzylidene)amino; Y represents hydrogen or halogen; R and R' each represents an alkylene group having 1 to 8 carbon atoms; and $n$ represents a number in the range of 0 to 3.

6 Claims, No Drawings

SURFACE-COATING COMPOSITIONS CONTAINING N-(INDAZOLYL-N¹-METHYL)DIALKANOLAMINES

This is a division of my copending application Serial Number 308,156, which was filed on November 20, 1972 which is now U.S. Patent No. 3,828,067.

This invention relates to surface-coating compositions. More particularly, it relates to surface-coating compositions containing N-(indazolyl-N¹-methyl)-dialkanolamines that have improved resistance to deterioration resulting from attack by fungi and other organisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full-scale utilization, particularly in those areas in those applications that are conducive to such attack. Various biocidal materials have been suggested for use in surface-coating compositions, but none has proven to be entirely satisfactory in this application. Some do not provide the required prolonged protection against attack by microorganisms, while others undergo sulfide staining, and still others tend to separate from the applied coating by migration, volatilization, or leaching once the coating has been spread in a thin layer over the surface to be protected.

In accordance with this invention, it has been found that surface-coating compositions can be protected from attack by fungi and other microorganisms by incorporating in them a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the viscosity and other physical properties of the surface-coating compositions.

The biocidal compounds that are used in the surface-coating compositions of this invention may be represented by the structural formula

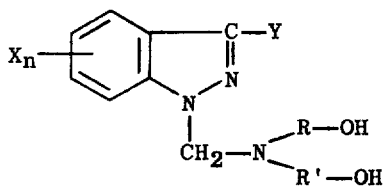

wherein X represents halogen (chlorine, bromine, fluorine, or iodine), nitro, amino, acetamino, (chlorobenzylidene)amino, (bromobenzylidene)amino, (fluorobenzylidene)amino, or (iodobenzylidene)amino; Y represents hydrogen, halogen, (chlorine, bromine, fluorine, or iodine); R and R' each represents an alkylene group having 1 to 8 carbon atoms; and n represents a number in the range of 0 to 3. Illustrative of these compounds are the following: N-(indazolyl-N¹-methyl)diethanolamine, N-(3-chloroindazolyl-N¹-methyl)dipropanolamine, N-(3-bromo-5,6-dinitroindazolyl-N¹-methyl)dioctanolamine, N-(3,5-difluoroindazolyl-N¹-methyl)dibutanolamine, N-(3,6-diiodoindazolyl-N¹-methyl)dihexanolamine, N-(6-acetaminoindazolyl-N¹-methyl)dipropanolamine, N-(4,7-diaminoindazolyl-N¹-methyl)dimethanolamine, N-[6-(chlorobenzylidene)aminoindazolyl-N¹-methyl]ethanolpropanolamine, N-(4,5,7-trichloroindazolyl-N¹-methyl)diethanolamine, N-(5,7-dichloroindazolyl-N¹-methyl)diethanolamine, N-[3-chloro-6-(p-bromobenzylidene)aminoindazolyl-N¹-methyl]propanolbutanolamine, N-(3,4,5,7-tetrabromoindazolyl-N¹-methyl)methanolpropanolamine, and the like.

Particularly effective as biocides for use in surfacecoating compositions are the compounds having the aforementioned structural formula in which X represents chlorine or nitro, Y represents chlorine or hydrogen, and R and R' each represents an alkylene group having 2 or 3 carbon atoms. Among the preferred compounds are N-(3-chloroindazolyl-N¹-methyl)diethanolamine, N-(5,7-dichloroindazolyl-N¹-methyl)diethanolamine, N-(4,5,7-trichloroindazolyl-N¹-methyl)ethanolpropanolamine, N-(3,5,7-trichloroindazolyl-N¹-methyl)dipropanolamine, N-(3-chloro-6-nitroindazolyl-N¹-methyl)dipropanolamine, and N-(5,6-dinitroindazolyl-N¹-methyl)-dipropanolamine.

The biocidal compounds may be prepared by any suitable and convenient procedure. For example, they may be prepared by heating an N¹-hydroxymethylindazole with the appropriate alkanolamine. The reaction is generally carried out in a solvent, such as toluene, acetone, or tetrahydrofuran, at the reflux temperature of the reaction mixture.

The biocidal compounds of this invention can be used to impart fungal and bacterial resistance to a wide variety of surfacecoating compositions including both solvent-based and water-based coating systems. They are of particular value as biocides in surface-coating compositions that contain as their resinous binder an organic, water-insoluble, film-forming resin that is a synthetic linear addition polymer or an oleoresinous binder.

In a preferred embodiment of the invention the N-(indazolyl-N¹-methyl)dialkanolamines are used as biocides in aqueous dispersions that contain about 10 to 60 percent by weight of a water-insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; the aforementioned methacrylic acid esters, and acrylic acid; copolymers of styrene with maleic anhydride; and mixtures thereof. Suitable oleoresinous binders include drying oils, such as linseed oil, tung oil, soybean oil, dehydrated castor oil, safflower oil, or fish oil; bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anahydride, and fatty acids; and mixtures thereof.

In another preferred embodiment of the invention, the N-(indazolyl-$N^1$-methyl)dialkanolamines are used as the biocide in organic solvent-based systems that contain an oleoresinous binder as hereinbefore defined.

Only a small concentration of the biocidal compound need be present in the surface-coating compositions. As little as 0.10 percent of one or more of these compounds, based on the weight of the composition, will bring about an appreciable improvement in the resistance of the composition to attack by microorganisms. Three percent or more of the biocidal compound, based on the weight of the composition, can be used, but these larger amounts generally do not provide further improvement in the properties of the surface-coating compositions and for this reason are not ordinarily used. While the amount of the biocide that will provide optimum protection for the surface-coating compositions depends upon such factors as the choice of biocidal compound, the choice of resinous binder and other components of the composition, the amount of each that is employed, and the application for which the coating composition is intended, in most cases about 1.0 percent to 2.0 percent of the biocidal compound, based on the weight of the surface-coating composition, is used.

In addition to the resinous binder and the biocidal compound, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The biocidal compounds may be incorporated into the surface-coating compositions by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone or other solvent.

The invention is further illustrated by the following examples.

EXAMPLE 1

A mixture of 18.3 grams (0.1 mole) of $N^1$-hydroxymethyl-3-chloroindazole, 10.5 grams (0.1 mole) of diethanolamine, and 150 ml. of toluene was heated at its reflux temperature until 1.8 ml. (0.1 mole) of water had been evolved. It was heated at its reflux temperature for an additional hour, cooled in an ice bath, and then filtered. The product was washed with toluene and dried at 40°C. under reduced pressure. There was obtained 26.1 grams (97% yield) of N-(3-chloroindazolyl-$N^1$-methyl)diethanolamine, which was a white solid that melted at 102.5°– 106.5°C. and that contained 12.3% Cl (calculated, 13.1% Cl).

EXAMPLE 2

A mixture of 21,7 grams (0.1 mole) of $N^1$-hydroxymethyl-5,7-dichloroindazole, 10.5 grams (0.1 mole) of diethanolamine, and 150 ml. of toluene was heated at its reflux temperature until 1.8 ml. (0.1 mole) of water had been evolved. It was heated at its reflux temperature for an additional 15 minutes after which 75 ml. of solvent was distilled off under vacuum at 70°C. and the concentrate was cooled. The separated solids were filtered off, washed with cold toluene and the combined filtrate and wash was stripped to dryness under vacuum to isolate the product. There was obtained 21.4 grams (70.5% yield) of N-(5,7-dichloroindazolyl-$N^1$-methyl)diethanolamine, which was a yellow semi-solid and that contained 24.1% Cl (calculated 23.4% Cl).

EXAMPLE 3

A. A polyvinyl acetate emulsion paint was prepared by mixing together the following materials:

| | Parts By Weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| 55% Aqueous dispersion of polyvinyl acetate | 350 |

B. An acrylic paint was prepared by mixing together the following materials:

| | Parts by Weight |
|---|---|
| Water | 250 |
| Acrylic ester resin (100% solids) (Acryloid B-66) | 385 |
| Monoethyl ether of ethylene glycol | 259 |
| Titanium dioxide | 143 |
| Aluminum silicate | 45 |
| Magnesium silicate | 98 |

C. An exterior house paint was prepared by mixing together the following materials:

| | Parts by Weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |

-continued

| | Parts by Weight |
|---|---|
| Manganese naphthenate (6% Mn) | 2.27 |
| Lead naphthenate (24% Pb) | 11.3 |

D. To samples of these paints was added either 2 percent by weight of one of the compounds of this invention or 2 percent by weight of a comparative biocide.

EXAMPLE 4

The acrylic paint, the polyvinyl acetate paint, and the oil based paint whose preparation is described in Example 3 were evaluated by means of an agar diffusion assay. In this test agar is inoculated with the test organism, the treated paint is placed in a well cut from the agar, and after incubation at 28°C. and 85–95% relative humidity, the activity of the biocide is measured by zones of inhibition. The biocidal compounds tested and the results obtained are given in the following table. In this table ZO — Zone of inhibition in mm.
0 — No growth; no zone of inhibition
Tr — Trace of zone of inhibition
— — Not tested
 Bacteria A - *Bacillus subtilis*
  B - *Aerobacter aerogenes*
  C - *Pseudomonas aeruginosa*
 Fungi D - *Pullularia pullulans*
  E - *Penicillium crustosum*
  F - *Aspergillus niger*

The compounds tested and the results obtained are set forth in the following table.

1. A surface-coating composition that comprises (a) a water-insoluble, film-forming resinous binder selected from the group consisting of oleoresinous binders, synthetic linear addition polymers obtained by the vinyl polymerization of monoethylenically-unsaturated monomers, and mixtures thereof and (b) about 0.10 percent to 3 percent, based on the weight of said composition, of a biocidal compound having the structural formula

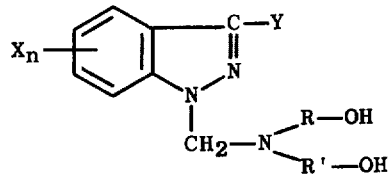

wherein X represents halogen; Y represents hydrogen or halogen; R and R' each represents an alkylene group having 1 to 8 carbon atoms; and n represents a number in the range of 0 to 3.

2. A surface-coating composition as defined in claim 1 that contains 1.0% to 2.0% based on the weight of the composition, of the biocidal compound.

3. A surface-coating composition as defined in claim 1 wherein the biocidal compound is N-(3-chloroindazolyl-N¹-methyl)diethanolamine.

4. A surface-coating composition as defined in claim 1 wherein the biocidal compound is N-(5,7-dichloroindazolyl-N¹-methyl)diethanolamine.

TABLE

| | | | Biodical Activity | | | | | |
|---|---|---|---|---|---|---|---|---|
| | | | Bacteria | | | Fungi | | |
| Biocide | Paint | pH | A | B | C | D | E | F |
| Product of Example 1 | Acrylic | 9.0 | Tr | 0 | ZO-5 | ZO-1 | ZO-1 | ZO-1 |
| | PVA | 8.3 | ZO-5 | ZO-2 | ZO-4 | ZO-1 | ZO-3 | Tr |
| | Oil | — | — | — | ZO-1 | ZO-1 | Tr | |
| Product of Example 2 | Acrylic | 9.1 | ZO-1 | Tr | ZO-1 | 0 | 0 | Tr |
| | PVA | 8.0 | ZO-1 | Tr | Tr | ZO-1 | ZO-2 | Tr |
| | Oil | — | — | — | — | Tr | ZO-1 | Tr |
| Bis(phenylmercury) | Acrylic | 8.4 | ZO-9 | ZO-5 | ZO-5 | ZO-8 | ZO-3 | ZO-9 |
| dodecenylsuccinate | PVA | 6.9 | ZO-10 | ZO-8 | ZO-5 | ZO-10 | ZO-6 | ZO-17 |
| (Super Ad-it) | Oil | — | — | — | — | ZO-7 | ZO-4 | ZO-10 |

Each of the other N-(indazolyl-N¹-methyl)dialkanolamines disclosed herein can be used in a similar way to protect surface-coating compositions from deterioration resulting from attack by fungi and bacteria.

What is claimed is:

5. A surface-coating composition as defined in claim 1 wherein the resinous binder is polyvinyl acetate.

6. A surface-coating composition as defined in claim 1 wherein the resinous binder is an acrylic ester resin.

* * * * *